ડ
3,009,925
17-AMINOANDROSTANES
John C. Babcock, Kalamazoo Township, Kalamazoo County, Mich., assignor to The Upjohn Company, Kalamazoo, Mich., a corporation of Michigan
No Drawing. Filed Dec. 7, 1959, Ser. No. 857,573
18 Claims. (Cl. 260—397)

This invention relates to 17β-aminoandrostanes, their 11-oxygenated derivatives, intermediates in the production thereof, and process for their production. It relates further to compositions of matter containing the aforementioned compounds having pharmacological usefulness as anti-fungal agents. The compounds coming within the scope of this invention also possess anti-inflammatory activity and anti-fertility activity.

The compounds of this invention can be represented by the following formula:

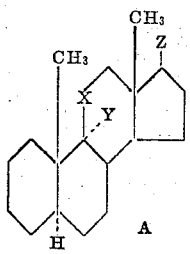

wherein X represents the methylene group, the α-hydroxymethylene group, the β-hydroxymethylene group, or the carbonyl group, and Y represents hydrogen or fluorine, the latter substituent occurring only when X is β-hydroxymethylene or carbonyl; and Z represents the β-amino group, either primary secondary, or tertiary. Where Z is a substituted amino group, i.e., secondary or tertiary, the substituent is a lower-alkyl group, preferably methyl or ethyl. Substituent Z can occur in the form of conjugate acid salts thereof or quaternary ammonium salts. In the formula, X and Y together can represent a double bond.

We have discovered that compounds of the foregoing formula possess marked anti-fungal properties as a characteristic.

A compound selected from the class defined in the formula above can be incorporated and administered to the animal organism, including birds and mammals, in the form of creams, ointments, tablets, capsules, pills, solutions, suspensions for oral or parenteral use and the like. The compounds are generally characterized by anti-fungal activity which renders them useful for topical, local, or systemic administration. Topically, the compounds are used in a concentration of about 0.1% to 2% in the form of dusting powders, troches, sprays, drops, suppositories, aqueous or oil dispersions or in the form of ointments, including a petrolatum-type grease base, creams, water-oil emulsions and lotions. For local treatment they are useful in combating gastro-intertinal fungal infections as well as in mastitis where fungous infection is present. They can be prepared in unit dosages for systemic use in birds and mammals, including humans, of 50-500 mg. The estimated dosage of such unit forms is 1 to 4 times per day depending upon the age, weight, and status of the patient. The usual excipients can be used, such as lactose, starch, and the like, and conventional compounding procedures employed using conventional binders in the case of tablets or pills. As will be illustrated below, other coactive ingredients can be added to the formulations such as other anti-fungal, anti-bacterial, and anti-inflammatory agents.

Of the compounds embraced in the formula above, those in which X represents an oxygenated group are novel chemical compounds, i.e., where X equals α-hydroxymethylene, β-hydroxymethylene, or carbonyl. Moreover, those wherein X and Y together represent a double bond are also novel.

Several of the compounds embraced within the formula above are known. For example, 17-aminoandrostane and its hydrochloride are disclosed in U.S. Patent No. 2,292,080. In U.S. Patent No. 2,863,885 of the present inventor, there are disclosed a number of 17β-amines within the scope of the formula as the reduction derivatives of 17-isonitrosoandrostanes. The detailed preparation by reductive derivation will be disclosed in the following specification.

The compounds of this invention can be prepared in accordance with the following flow sheets, the various steps of which are illustrated in detail in the preparations and examples which follow.

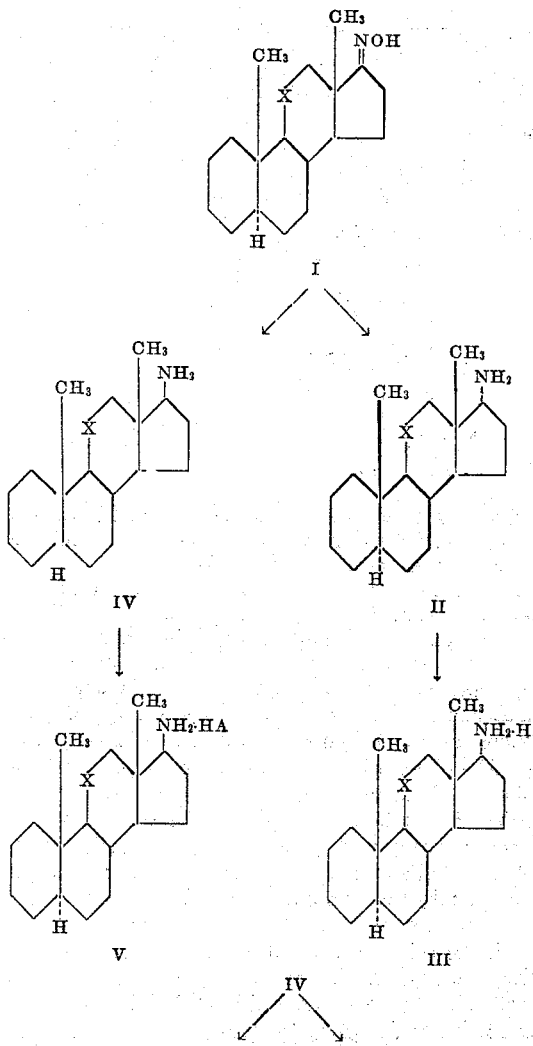

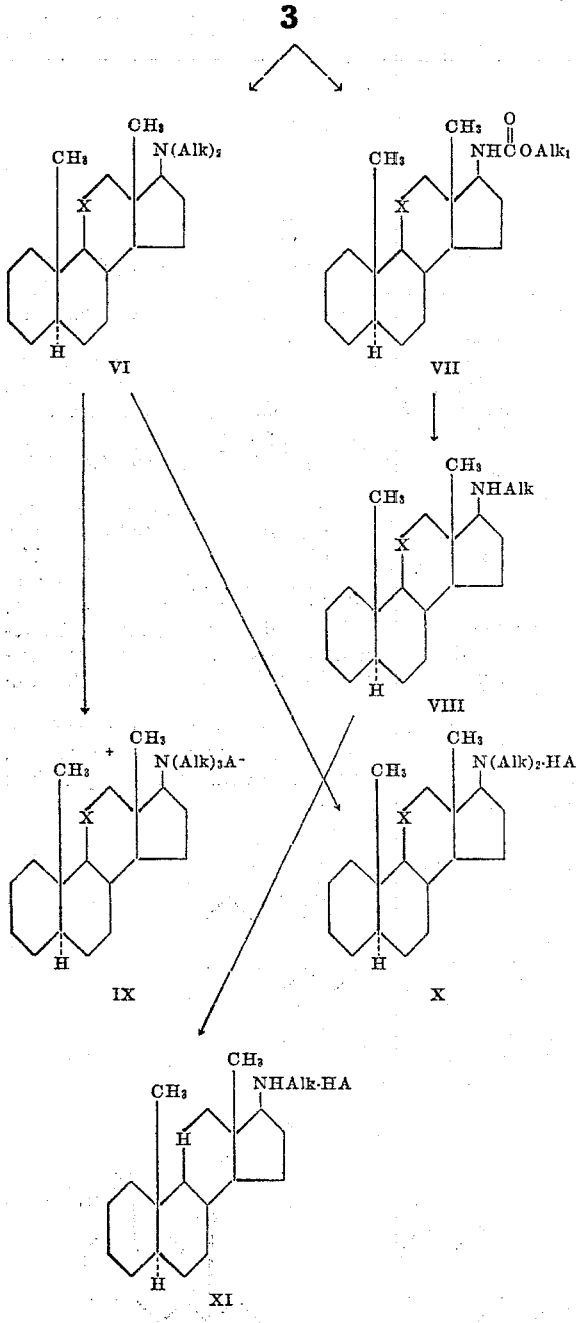

In the flow sheets above, the substituent X has the designation previously given. In addition, the substituent Y of Formula A can occur in the formulae of the flow sheets. The necessary starting materials, i.e., I bearing a 9α-fluoro substituent, will be described below. When Formula I contains the 9α-fluoro substituent, it will appear in each of the remaining formulae of the flow sheets, representative compounds being 17β-amino-9α-fluoro-5α-androstan-11β-ol and its hydrochloride, 17β-methylamino - 9α - fluoro - 5α - androstan - 11 - one and 17β - N,N - dimethylamino - 9α - fluoro - 5α - androstan-11β-ol and its hydrochloride.

Further, in the flow sheets above, the substituent HA represents a strong acid, preferably a therapeutically accepted acid. The acids can be either mineral acids, e.g., hydrobromic, hydrochloric; or organic acids, e.g., formic, acetic, acetylsalicyclic, and the like. In the case of di-ionic mineral acids such as sulfuric and phosphoric, and the like, the configuration of the above salts (II, V, X, XI) will take the conventional bi-salt form.

Further in the foregoing formulae, the substituent Alk represents an alkyl group of from 1 to 12 carbon atoms, preferably a lower-alkyl group of up to 8 carbon atoms, such as methyl, ethyl, propyl, isopropyl, butyl, isobutyl, and the like. The substituent $Alk_1$ is likewise an alkyl group of the same range of values as Alk, but which may be the same as or different from Alk.

In Formula IX, the substituent A is a pharmacologically acceptable anion, preferably a halide such as chloride, bromide and iodide. In Formula IX, the substituent group—$N(Alk)_3$ when connected to the androstane body of Formula IX represents the complementary cation with A. Together the two ions represent a quaternary ammonium compound. The substituent group preferably contains three similar alkyl radicals as defined above. It can contain, however, alternatively two alkyl groups, being the residual alkyl groups of VI, together with a different alkyl group.

The starting materials I are disclosed in U.S. Patent No. 2,863,885. Upon reduction, as disclosed in the patent, effected, for example, by reaction of I with lithium in a mixture of ether, isopropyl alcohol and liquid ammonia, there is produced the 17-amino product IV.

Produced concomitantly with IV is the 17α-amino epimer II which also posseses anti-fungal properties of the same kind as the 17β-amino compounds.

IV, when brought into contact with an acid HA, under conventional salt-forming conditions is converted to the corresponding HA salt, V. II undergoes the same reaction. IV can be converted to its secondary amino derivative VIII which in turn can be converted to its HA acid salt XI. The conversion of IV to its secondary amino derivative is carried out under conventional conditions via the urethane intermediate VII, prepared from IV by reaction with an alkyl chlorocarbonate. This is accomplished by reaction, for example, of IV with the alkyl chlorocarbonate in the presence of a tertiary organic base such as pyridine, lutidine, or collidine. The conversion of VII to VIII is accomplished under conventional conditions for converting amides to amines, i.e., by reduction, for example, with lithium aluminum hydride.

The tertiary amino derivatives of IV, i.e., VI, can be prepared by conventional amine-alkylating conditions, e.g., by reaction of an alkyl aldehyde with IV in the presence of formic acid, by reaction of IV with an alkyl halide in the presence of a base, or by reaction of IV with a dialkyl-phosphonate in the presence of a base.

The acid salts (X) of VI are prepared by the conventional salt-forming reactions, i.e., by reaction of VI with a solution of the acid.

The quaternary salts IX can be prepared by reaction of VI with an alkyl halide ($Alk_1$—A). The quaternizing reaction is preferably carried out in solution, in particular in a solvent in which both VI and the organic compound are soluble.

In the formulae of the foregoing flow sheets, substituent X has been described as methylene, α-hydroxymethylene, β-hydroxymethylene, or carbonyl. When X is carbonyl, I will undergo all the transformations shown in the flow sheets except that of VII→VIII. To obtain VIII where X is carbonyl, and subsequently XI, it is necessary to employ an alternative secondary amine-forming procedure. The procedure is known to chemists as the Becker-Decker procedure and it consists in converting IV to the corresponding imine by reaction with an hydrocarbon (RCHO) aldehyde such as benzaldehyde, in a solvent such as benzene, if desired, with azeotropic removal of water. The resulting imine, i.e., where the 17-substituent group is —N=CHR is then alkylated with an alkyl halide to produce the corresponding ternary imminium salt wherein the 17-substituent group is —(Alk)—N=CHR which, when attached to the androstene body of Formula IV forms the cation, the anion being the halide derived from the alkyl halide used. The alkylation procedures are carried out by conventional processes, preferably by stirring under nitrogen in benzene or ether solution. The ternary imminium salt can then be hydrolyzed to produce VIII under conventional alkaline hydrolysis conditions.

The novel compounds of this invention represented by Formula A above, as previously stated, possess valuable anti-fungal properties. This activity is illustrated in the following table wherein the tabulated numerical values are the results of standard anti-fungal screening carried out by incorporating the test compound in agar in petri dishes at concentrations of 1000, 100 and 10 mcg. per ml. and streaking suspensions of fungal pathogens on the agar surface. The degree of inhibition of growth is observed after 72 hours at 28° C. Plain agar controls are also streaked with the test organisms. The values in the substituent columns headed $R^1$ and $R^2$ are taken from the formula

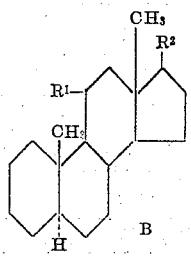

the flow sheets, and Formula B, which contain an 11-oxygenated substitutent such as β-hydroxy, α-hydroxy, and keto.

In the examples are also listed the detailed syntheses of a number of compounds disclosed in the acknowledged prior patent art.

PREPARATION 1

*17β-amino-5α-androstane (IV) and its hydrochloride (V)*

A solution of 7.21 g. of 17-isonitroso-5α-androstane was made up in 360 ml. of acetic acid, and 10 drops of hydrochloric acid were added. To this solution was added 1.5 g. of platinum oxide and the suspension was shaken under an atmosphere of hydrogen for 16 hours. The platinum oxide was then removed by filtration and the filtrate was evaporated to dryness under vacuum. The residual solute was dissolved by stirring in a mixture of 10% aqueous potassium hydroxide covered by a layer of ether. The ethereal layer was separated and treated with 2.5 N hydrochloric acid, whereupon there separated 17β-amino-5α-androstane hydrochloride, a white crystalline solid (6.6 g.) melting at 336–354° C. with charring and decomposition. When crystallized from methanol: 2.5 N hydrochloric acid, the compound had a melting point of 343–350° C.

*Analysis.*—Calcd. for $C_{19}H_{34}ClNO$: C, 73.16; H, 11.19; N, 4.49. Found: C, 72.91; H, 11.06; N, 4.26.

TABLE I.—ANTIFUNGAL ACTIVITIES OF 17-AMINO-$C_{19}$ STEROIDS

| $R^1$ | $R^2$ | N.a. | B.d. | C.i. | G.c. | H.c. | C.n. | S.s. | M.a. | T.r. | C.a. | M.c. | B.b. | T.i. |
|---|---|---|---|---|---|---|---|---|---|---|---|---|---|---|
| β-OH | β-NH₂·HCl | [1]10 | 10 | 10 | 10 | -------- | 10 | 10 | 10 | -------- | -------- | 10 | -------- | 10 |
| β-OH | α-NH₂·H₂O | 1,000 | 1,000 | (²) | (²) | -------- | (²) | (²) | (²) | -------- | -------- | (²) | -------- | (²) |
| β-OH | β-HN₂ | 10 | 10 | 10 | 10 | -------- | 10 | 10 | 10 | -------- | -------- | 10 | -------- | 10 |
| β-OH | β-N(CH₃)₂ | 100 | 100 | 100 | 10–100 | -------- | 10 | 10 | 100 | -------- | -------- | 100 | -------- | 100 |
| β-OH | β-N(CH₃)₂·HCl | 10 | 10–100 | 10–100 | 10 | -------- | 10 | 10 | 100 | -------- | -------- | 10 | -------- | 10 |
| β-OH | α-NH₂·HCl | 100 | 1,000 | (²) | (²) | -------- | 1,000 | 1,000 | (²) | -------- | -------- | 1,000 | -------- | 1,000 |
| β-OH | β-NH₂·HCO₂H | 10 | 10 | 10 | 10 | -------- | 10 | 10 | 10 | -------- | -------- | 10 | -------- | 10 |
| H | β-NH₂·HCl | 10 | 10 | 10 | 10 | -------- | 10 | 10 | 10 | -------- | -------- | 10 | -------- | 10 |
| β-OH | β-N⁺(CH₃)₃ I⁻ | 100 | 100 | 100 | 1,000 | -------- | 100 | 100 | 100 | -------- | -------- | 100 | -------- | 100 |
| β-OH | β-NH₂·HCl | 100 | 100 | 100 | 10 | 10 | 10 | 100 | 100 | 100 | 100 | 100 | 100 | 100 |
| H | β-NH₂ | 10 | 10 | 10 | 10 | 10 | 10 | 10 | 10 | 10 | 100 | 10 | 10 | 10 |
| H | β-N(CH₃)₂ | 100 | 10 | 100 | 10 | 10 | 10 | 100 | 100 | 10 | 100 | 100 | 100 | 100 |
| H | N⁺(CH₃)₃ I⁻ | 100 | 10 | 100 | 100 | 100 | 10 | 10 | 100 | 10 | 10 | 10–100 | 10–100 | 10 |

The explanation of the abbreviations in the above table are as follows:
- N.a.=*Nocardia asteroides.*
- B.d.=*Blastomyces dermatitides.*
- C.i.=*Coccidiocides immitis.*
- G.c.=*Geotrichum* sp. *correctasis.*
- H.c.=*Hormodendrum compactum.*
- C.n.=*Cryptococcus neoformans.*
- S.s.=*Sporotrichum schenkii.*
- M.a.=*Monosporium apiospermum.*
- T.r.=*Trichophyton rubrum.*
- C.a.=*Candida albicans* Ab.
- M.c.=*Microsporum canis.*
- B.b.=*Blastomyces brasilinsis.*
- T.i.=*Trichophyton interdigitale.*

[1] MIC (Minimum inhibiting concentration, mcg./ml.).
[2] No inhibition.

The following examples illustrate the preparation of the novel androstane compounds of this invention. These compounds comprise those of Formula A, the formulae of the flow sheets, and Formula B, which contain an 11-oxygenated substituent.

The free amine was obtained from the hydrochloride by conventional procedures as described in Example 1, below. It had a melting point of 86–90° C.

Analysis.—Calcd. for $C_{19}H_{33}N$: C, 82.84; H, 12.08; N, 5.09. Found: C, 82.71; H, 12.48; N, 5.25.

EXAMPLE 1

17β-amino-5α-androstan-11β-ol (IV), its hydrochloride (V), the 17α-epimer (II), and its hydrochloride (III)

To a solution containing 20 g. of lithium, added as wire, in 1.5 liters of liquid ammonia there was added 20.0 g. of 17-isonitroso-5α-androstan-11β-ol dissolved in 180 ml. of isopropanol and 180 ml. dry diethyl ether. After stirring the solution for 3 hours, an additional 40 ml. of isopropanol was added. The resulting grey suspension was evaporated to dryness and the residue then washed with 1.5 liters of ether. When this ether extract was treated with 40 ml. of 2.5 N hydrochloric acid, 17β-amino-5α-androstan-11β-ol hydrochloride precipitated as crystalline plates (10.20 g.). It melted at 272–300° C. with decomposition. A sample, recrystallized from ethyl acetate:methanol, melted at 300–304° C. with decomposition.

Analysis.—Calcd. for $C_{19}H_{34}ClNO \cdot CH_3OH$: C, 66.72; H, 10.64; N, 3.87. Found: C, 66.58; H, 10.49; N, 3.99.

Extended drying at 80–100° C. gave the non-solvated 17β-amino-5α-androstan-11β-ol hydrochloride.

A suspension of 5.55 g. of the above hydrochloride methanol solvate product in 55 ml. of 10% aqueous potassium hydroxide and 200 ml. of ether was stirred until a clear, two-phase solution was obtained. The ethereal layer was separated, washed with water and evaporated to dryness, yielding the free amine as a solid residue. The free amine was crystallized from aqueous methanol as fine fibrous needles that melted at 194–196° C. Further recrystallization yielded fine needles melting at 192–193° C.

Analysis.—Calcd. for $C_{19}H_{33}NO \cdot \frac{1}{4}H_2O$: C, 77.09; H, 11.33; N, 4.73. Found: C, 77.37, 77.39; H, 11.44, 11.25; N, 4.92.

Extended drying at 80–100° C. under vacuum gave the non-solvated 17β-amino-5α-androstan-11β-ol.

The ethereal solution of the reduction product remaining after the hydrochloride had been precipitated, above, was washed with water and evaporated to dryness in vacuo to afford a clear gum. The gum was crystallized from aqueous methanol yielding 10.55 g. of 17α-amino-5α-androstan-11β-ol which melted at 85–90° C. A sample, after recrystallization, melted at 91–100° C. with decomposition.

Analysis.—Calcd. for $C_{19}H_{35}NO_2 \cdot H_2O$: C, 73.73; H, 11.40; N, 4.53. Found: C, 73.86; H, 10.25; N, 4.46.

Extended drying at 80–100° C. under vacuum afforded the non-solvated 17α-amino-5α-androstan-11β-ol.

This α-amino compound (II) was converted to its hydrochloride salt (M.P. 161.5–165 dec.) by passing hydrogen chloride into an ether solution of the free amine. It was purified by recrystallization from ethyl acetate:normal hexane.

Analysis.—Calcd. for $C_{19}H_{34}ClNO \cdot 1\frac{1}{2}H_2O$: C, 64.28; H, 10.51; N, 3.95. Found: C, 64.50; H, 10.31; N, 4.10.

Extended drying at 80–100° C. under vacuum afforded the non-solvated 17α-amino-5α-androstan-11β-ol hydrochloride.

EXAMPLE 2

17β-amino-5α-androstan-11-one (IV)

Twelve milliliters of ethyl chlorocarbonate was added to an ice-cooled solution of 6.0 g. of 17β-amino-5α-androstan-11β-ol in 60 ml. of pyridine. The mixture was allowed to stand for several hours and was then poured into water, and the resulting mixture extracted with ether. The ether extract was washed with water, dried over magnesium sulfate, and evaporated to dryness. The residue, 17β-amino-5α-androstan-11β-ol, N-carbethoxylate can be purified by chromatography.

In the pure or crude form, the foregoing N-carbethoxylate is oxidized with chromic oxide and acetic acid under conditions conventionally employed for the conversion of hydrocortisone acetate to cortisone acetate. The oxidation produced thus obtained 17β-amino-5α-androstan-11-one, N-carbethoxylate, is hydrolyzed with 10–20% aqueous sodium hydroxide in ethylene glycol to afford 17β-amino-5α-androstan-11-one which can be recovered from the hydrolysis mixture by diluting the reaction mixture with water, extracting thoroughly with ether, washing the ether with dilute acid, basicifying the dilute acid and extracting the product therefrom with ether. Evaporation of the ether affords a residue of 17β-amino-5α-androstan-11-one which can be purified by recrystallization from acetone:Skellysolve B hexanes or from aqueous methanol.

EXAMPLE 3

17β-N,N-dimethylamino-5α-androstan-11β-ol (VI) and its hydrochloride (X)

A suspension of 5.22 g. of 17β-amino-5α-androstan-11β-ol of Example 1 in 4.2 ml. of formic acid and 3.6 ml. of formalin (prepared with cooling in ice), was warmed at 80° until the evolution of gas ceased. After 1½ hours heating under reflux, the syrup was allowed to cool and was concentrated in vacuum. The residue was taken up in methylene chloride and then washed with saturated aqueous sodium bicarbonate followed by water. The solid which remained when the solvent was removed was recrystallized twice from methanol to afford 1.80 g. of 17β-N,N-dimethylamino-5α-androstan-11β-ol, M.P. 161–164°.

One further crystallization from the same solvent afforded an analytical sample, M.P. 161.5–163°.

Analysis.—Calcd. for $C_{21}H_{37}NO$: C, 78.94; H, 11.67; N, 4.38. Found: C, 79.16; H, 11.83; N, 4.52.

The hydrochloride, M.P. 303–304°, was prepared by reaction with hydrogen chloride in the manner described in Example 1.

Analysis.—Calcd. for $C_{21}H_{38}ClNO \cdot H_2O$: C, 67.43; H, 10.86; N, 3.75. Found: C, 67.19; H, 10.64; N, 3.67.

Extensive drying in vacuo at 80–100° afforded an anhydrous sample of the hydrochloride.

EXAMPLE 4

17β-N,N-dimethylamino-5α-androstan-11β-ol, methiodide (IX)

Methyl iodide (5 ml.) was added to a solution of 1.86 g. of the tertiary amine of Example 3. Within 30 minutes, glistening crystals began separating. At the end of 15 hours, the solid was collected on a funnel and recrystallized from the monomethyl ether of ethylene glycol to afford 1.06 g. of the quaternary salt, 17β-N,N-dimethylamino-5α-androstan-11β-ol, methiodide (IX), M.P. 307–308°.

Analysis.—Calcd. for $C_{22}H_{40}INO$: C, 57.25; H, 8.74; N, 3.04. Found: C, 57.23; H, 9.11; N, 3.02.

EXAMPLE 5

17β-N,N-diethylamino-5α-androstan-11β-ol (VI) and methiodide (IX)

The procedure of Example 3 is followed, substituting acetaldehyde for the formalin of Example 3, to produce 17β-N,N-diethylamino-5α-androstan-11β-ol, which can be purified by crystallization from methanol to form light-colored crystals. It can be converted to the hydrochloride salt by reaction with hydrogen chloride in ether solution following the procedure of Example 1.

In the manner described in Example 4, but substituting the foregoing 17β-N,N-diethylamino-5α-androstan-11β-ol for the tertiary amine of the example then is produced 17β-N,N-diethylamino-5α-androstan - 11β - ol methiodide (IX).

EXAMPLE 6

17β-amino-9α-fluoro-5α-androstan-11β-ol (IV) and its hydrochloride

9α-fluoro-17-isonitroso-5α-androstan-11β-ol is produced from 9(11)-androsten-17-one by reaction with N-bromoacetamide in aqueous perchloric acid. This reaction produces 9α-bromo-11β-hydroxy-5α-androstan-17-one which is in turn treated in accordance with the procedures disclosed in U.S. Patent No. 2,852,511, particularly Examples 4 and 13, i.e., by reaction with potassium acetate in absolute ethanol solution to produce first 9β,11β-oxido-5α-androstan-17-one, and then reacting this 9β,11β-oxide with anhydrous hydrogen fluoride in chloroform solution to produce 9α-fluoro-11β-hydroxyandrostan-17-one. This compound can be converted to 9α-fluoroandrostane-11,17-dione by oxidation with chromic acid in aqueous acetic acid under the conditions conventionally employed for oxidizing hydrocortisone acetate to cortisone acetate.

9α-fluoro-11β-hydroxy-5α-androstan-17-one and 9α-fluoro-5α-androstane-11,17-dione are converted respectively by reaction with hydroxylamine hydrochloride in pyridine under the conditions of Example 3 of U.S. Patent No. 2,863,885 to produce 9α-fluoro-17-isonitroso-5α-androstan-11β-ol and 9α-fluoro-17-isonitroso-5α-androstan-11-one, respectively. These two compounds are respectively subjected to catalytic reduction under the conditions of Preparation 1 above to produce 17β-amino-9α-fluoro-5α-androstan-11β-ol and 17β-amino-9α-fluoro-5α-androstan-11-one, respectively.

EXAMPLE 7

*17β,N,N-dimethylamino-9α-fluoro-5α-androstan-11β-ol (VI), its hydrochloride (X) and its methiodide (IX)*

Employing the product of Example 6, 17β-amino-9α-fluoro-5α-androstan-11β-ol, in the process of Example 3 for the amine therein used, there is produced 17β-N,N-dimethylamino-9α-fluoro-5α-androstan-11β-ol and its hydrochloride, respectively.

The tertiary amine produced in the foregoing paragraph, when substituted in the process of Example 4, for the tertiary amine used therein is productive of 17β-N,N-dimethylamino-9α-fluoro-5α-androstan-11β-ol methiodide.

EXAMPLE 8

*17β-N-methylamino-5α-androstane (VIII) and its hydrochloride (XI)*

Twelve milliliters of ethyl chlorocarbonate was cautiously added to an ice-cooled solution of 6.0 g. of the amine of Preparation 1 in 60 ml. of pyridine. After 2 hours' standing the mixture was poured into water and this extracted with ether. The extract was washed well with water, dried over magnesium sulfate and taken to dryness to afford the urethane (VII) as an amorphous jel like solid. This was purified by chromatography on Florisil synthetic magnesium silicate (elution with 4% acetone:hexane).

A clear solution of the urethane obtained above in 200 ml. of tetrahydrofuran was added to a well stirred suspension of 6.0 g. of lithium aluminum hydride in the same solvent. Following 15 hours heating under reflux the reaction mixture was allowed to cool and the excess reagent destroyed with ethyl acetate. Water (12 ml.) and 20% potassium hydroxide (12 ml.) were then added. The gelatinous precipitate was removed by filtration and the filtrates were taken to dryness. The residual gum, 17β-N-methylamino-5α-androstane, was converted to the hydrochloride by reaction with hydrogen chloride as in Example 1 above. One crystallization of the hydrochloride salt from methanol:2.5 N-hydrochloric acid afforded 4.36 g., M.P. 306–308° (sealed capillary).

One further crystallization from the same solvent pair gave a pure sample, M.P. 307–310° (sealed capillary).

*Analysis.*—Calcd. for $C_{20}H_{36}ClN \cdot CH_3OH$: C, 70.45; H, 11.26; N, 3.91. Found: C, 70.60; H, 11.59; N, 4.02.

Extensive drying in vacuo at 80–100° afforded material free of solvation.

EXAMPLE 9

*17β-N,N-dimethylamino-5α-androstane (VI)*

A suspension of 5.3 g. of the amine of Preparation 1 in 4.6 ml. of formic acid and 4.0 ml. of formalin was warmed at 60–65° until all effervescence stopped (1 hour). The solution was then heated under reflux for 1½ hours. The excess reagent was removed in vacuum and the residue taken up in ether and methylene chloride. The solution was washed with saturated aqueous sodium bicarbonate and water and dried over magnesium sulfate. The solid which remained on evaporation of the solution was recrystallized from aqueous ethanol to yield 2.70 g. of the tertiary amine, M.P. 89.5–95°. Further crystallization from the same solvents afforded a pure sample, M.P. 87–98.5.

*Analysis.*—Calcd. for $C_{21}H_{37}N$: C, 83.10; H, 12.69; N, 4.62. Found: C, 82.96; H, 12.24; N, 4.80.

The hydrochloride (X), M.P. 281–282° (sealed capillary) was prepared in the manner described above.

*Analysis.*—Calcd. for $C_{21}H_{38}ClN \cdot \frac{1}{4}H_2O$: C, 71.37; H, 11.26; N, 3.96. Found: C, 71.66; H, 11.62; N, 4.00.

Extensive drying under vacuum at 80–100° C. afforded material free of solvent.

EXAMPLE 10

*17β-N-methylamino-5α-androstan-11β-ol (VIII)*

The free 17β-amino-5α-androstan-11β-ol produced in Example 1 above is substituted in the process of Example 8. The reaction with ethyl chlorocarbonate is productive of 17β - amino - 5α-androstan-11β-ol, N-carbethoxylate (VII). This product when reduced with lithium aluminum hydride in accordance with the procedure of Example 8 is productive of 17β-N-methylamino-5α-androstan-11β-ol which is converted to the hydrochloride as in Example 8.

EXAMPLE 11

*Salts of pharmacologically acceptable acids*

Substitution of sulfuric acid and phosphoric acid successively for hydrogen chloride in the procedures of Example 1, Example 3, and Examples 8 and 9 is productive of, successively, the sulfate and phsophate salts of the product of the respective preparation and examples in place of the hydrochlorides.

EXAMPLE 12

*17β-N,N-dimethylamino-5α-androstane, methiodide (IX)*

A solution of 0.70 g. of the tertiary amine of Example 9 in 25 ml. of ethanol and 5 ml. of methyl iodide was allowed to stand 18 hours. At the end of this time the solution was poured into 200 ml. of ether. There was precipitated the quaternary salt, M.P. 273–278°.

A single crystallization from acetonitrile afforded 0.48 g. of long flat needles, M.P. 281.5–283.5°. (dec.).

*Analysis.*—Calcd. for $C_{22}H_{40}IN$; C, 59.31; H, 9.05; N, 3.14. Found: C, 59.29; H, 9.31; N, 3.40.

EXAMPLE 13

Substituting 17-isonitroso-9(11)-androstene, prepared as described in Example 4 of U.S. Patent No. 2,863,885, for 17-isonitroso-5α-androstan-11β-ol in the process of Example 1 there is obtained 17β-amino-9(11)-androstene hydrochloride, a crystalline solid. It is converted to 17β-amino-9(11)-androstene as described in Example 1.

EXAMPLE 14

*17β-N-methylamino-9α-fluoro-5α-androstan-11β-ol*

Following the procedure of Example 8, but using 17β-amino-9α-fluoro-5α-androstan-11β-ol as starting material is productive of 17β-N-methylamino-9α-fluoro-5α-androstan-11β-ol and its hydrochloride.

EXAMPLE 15

Substituting 17-isonitroso-5α-androstan-11α-ol, prepared as described in Example 2 of U.S. Patent No. 2,863,885 in place of 17-isonitroso-5α-androstane in the process of Preparation 1, there is produced 17β-amino-5α-androstan-11α-ol hydrochloride, a crystalline solid. The free amine is produced as described in Example 1.

Typical compositions embodying compounds of this invention for pharmacological use are exemplified in the following examples.

EXAMPLE 16

Tablets 10,000 scored tablets for oral use, each containing 400 mg. of 17β-dimethylamino-5α-androstan-11β-ol hydrochloride, are prepared from the following types and amounts of ingredients:

| | Grams |
|---|---|
| 17β-dimethylamino-5α-androstan-11β-ol hydrochloride | 4000 |
| Starch U.S.P. | 350 |
| Talc U.S.P. | 250 |
| Calcium stearate | 35 |

The powdered 17β-dimethylamino-5α-androstan-11β-ol hydrochloride is granulated with a 4% w./v. aqueous solution of methylcellulose U.S.P. (1500 cps.). To the dried granulated mixture is added the mixture of the remainder of the ingredients and the final mixture is compressed into tablets of proper weight. The tablets are suitable for the treatment of moderately severe tinea corporis in adults of average weight in a dosage schedule of 1 tablet three times a day. For children (30 to 50 pounds) a half tablet three times a day is adequate.

In a 200 mg. tablet of the above formulation, it is advantageous to add for the treatment of tinea corporis other co-active materials such as other anti-fungal agents (e.g., Griseofulvin, 100–200 mg.), antibacterial agents (e.g., Tetracycline, 125–250 mg.; Novobiocin, 125–250 mg.; Sulfadiazine, 200–400 mgm.; and the like), and anti-inflammatory agents (e.g., Prednisolone 5–20 mg.; Methylprednisolone, 2–15 mg.; and the like).

Similarly, 200 mg. scored tablets of 17β-amino-5α-androstan-11β-ol or 17β-amino-5α-androstan-11β-ol hydrochloride are prepared by substituting in the above formulation 2000 g. of 17β-amino-5α-androstan-11β-ol or 17β-amino-5α-androstan-11β-ol hydrochloride for the 4000 g. of 17β-dimethylamino-5-androstan-11β-ol hydrochloride. These tablets are suitable for the treatment of rheumatic, arthritic, and other inflammatory conditions in a dose of ½–2 tablets 1–3 times a day.

EXAMPLE 17

Capsules 10,000 two-piece hard gelatin capsules for oral use, each containing 250 mg. of 17β-amino-5α-androstane hydrochloride, are prepared from the following amounts and types of ingredients:

| | Grams |
|---|---|
| 17β-amino-5α-androstane hydrochloride | 2500 |
| Lactose U.S.P. | 1000 |
| Starch U.S.P. | 300 |
| Talc U.S.P. | 65 |
| Calcium stearate | 25 |

The powdered 17β-amino-5α-androstane hydrochloride is mixed with the starch-lactose mixture followed by the talc and calcium stearate. The final mixture is then encapsulated by the usual techniques into two-piece capsules.

The capsules are suitable for the treatment of fungous infections of the nails using 2 to 4 capsules per day.

Similarly, two-piece hard gelatin capsules containing 200 mg. of 17β-amino-5α-androstan-11β-ol or 17β-amino-5α-androstan-11β-ol hydrochloride are prepared by substituting in the above formulation 2000 g. of 17β-amino-5α-androstan-11β-ol or 17β-amino-5α-androstan-11β-ol hydrochloride for the 2500 g. of 17β-amino-5α-androstane hydrochloride. These capsules are suitable for the treatment of rheumatic, arthritic, and other inflammatory conditions in a dose of 1–2 capsules 1–3 times per day. For the treatment of moderately severe rheumatic inflammations in adults of average weight, a dose of one capsule, three times a day would be suitable.

EXAMPLE 18

Aqueous suspension

An aqueous suspension for oral use containing in each 5 ml. 125 mg. of 17β-amino-5α-androstan-11β-ol is prepared from the following types and amounts of ingredients:

| 17β-amino-5-androstan-11β-ol | grams | 250 |
|---|---|---|
| Methylparaben U.S.P. | do | 7.5 |
| Propylparaben U.S.P. | do | 2.5 |
| Saccharin sodium | do | 12.5 |
| Cyclamate sodium (sodium cyclohexylsulfamate) | do | 2.5 |
| Glycerin | milliliters | 3000 |
| Tragacanth powder | grams | 10 |
| Orange oil flavor | do | 10 |
| F.D. and C. orange dye | do | 7.5 |
| Deionized water q.s. to | milliliters | 10,000 |

One or two teaspoonfuls (5–10 ml.) administered four times a day is suitable for prevention of conception.

One or two teaspoonfuls (5–10 ml.) administered once a day is suitable for the treatment of rheumatic, arthritic, and other inflammatory conditions.

EXAMPLE 19

Dusting powder

A topical dusting powder suitable for the treatment of fungous infections on the foot or on other parts of the body is prepared from the following types and amounts of ingredients:

| | Grams |
|---|---|
| 17β-amino-5α-androstane, fine powder (200 mesh) | 10 |
| Zinc stearate | 350 |
| Bentonite | 640 |

Two applications of the powder per day to feet infected with moderately severe athlete's feet would be suitable course of treatment until symptoms subside.

EXAMPLE 20

Cream 25 kilograms of a topical cream for treating fungous infections of the skin or scalp are prepared from the following types and amounts of materials:

| | Grams |
|---|---|
| Stearic acid N.F. | 5000 |
| Isopropyl myristate | 500 |
| 17β-amino-5α-androstan-11β-ol | 62.5 |
| Methylparaben U.S.P. | 25 |
| Triethanolamine U.S.P. | 500 |
| Propylene glycol U.S.P. | 2500 |
| Perfume q.s. | |
| Deionized water q.s. to | 25,000 |

The stearic acid is melted and the isopropyl myristate mixed therein. The finely powdered 17β-amino-5α-androstan-11β-ol is suspended in the mixture. The methylparaben is dissolved in part of the water at about 70° C., and the triethanolamine and propylene glycol are added to the aqueous solution. With constant stirring the aqueous solution is combined with the 17β-amino-5α-androstan-11β-ol stearic acid-isopropyl myristate mixture. The combination is stirred until the temperature reaches about 40° C. The perfume is added and any water loss replaced. Stirring is continued until congealing occurs. The cream is assayed for potency and filled into 5 g. tubes. The preparation is suitable for use in the treatment of moderately severe tinea barbae of the face or neck by direct application to infected areas of the skin twice a day.

In the above formulation, it is advantageous to add other coactive materials such as other anti-fungal agents (e.g., Filipi, 0.1–1%; undecylenic acid, 2%; and the like), antibacterial agents (e.g., neomycin sulfate, ½%; Polymixin, 5000 units/gram of cream; and the like), and anti-inflammatory agents (e.g., fluorometholone, 0.1–0.25%; Methylprednisolone, 0.15–1%; and the like).

Suitable concentrations of the active ingredients of this invention for topical or local use would range from about 0.1 to about 2%.

I claim:
1. An 11-oxygenated-17β-amino - 5α - androstane compound having the following structural formula:

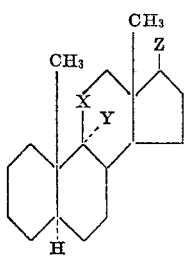

wherein X is a member of the group consisting of α-hydroxymethylene, β-hydroxymethylene, and carbonyl; Y is a member of the group consisting of hydrogen and fluorine; and X and Y can together constitute a 9(11)-double bond; and Z is a member of the group consisting of primary amino, monoalkyl amino, and dialkyl amino groups, the acid salts thereof with pharmacologically acceptable acids and the quaternary salts thereof with pharmacologically acceptable anions.

2. 17β-N,N-dimethylamino-5α-androstan-11β-ol.
3. 17β-N,N-dimethylamino-5α-androstan-11β-ol hydrochloride.
4. 17β-N,N-dimethylamino-5α-androstan-11β-ol, meth-iodide.
5. 17β-N,N-dimethylamino-9(11)-androstene.
6. 17α-amino-5α-androstan-11β-ol.
7. 17α-amino-5α-androstan-11β-ol hydrochloride.
8. 17β-amino-5α-androstan-11β-ol.
9. 17β-amino-5α-androstan-11β-ol hydrochloride.
10. 17β-amino-5α-androstan-11α-ol.
11. 17β-amino-5α-androstan-11α-ol hydrochloride.
12. 17β-amino-5α-androstan-11-one.
13. 17β-amino-5α-androstan-11-one hydrochloride.
14. 17β-amino-9(11)-androstene.
15. 17β-amino-9(11)-androstene hydrochloride.
16. 17β-amino-9α-fluoro-5α-androstan-11β-ol.
17. 17β-amino-9α-fluoro - 5α - androstan-11β-ol hydrochloride.
18. 17β-methylamino-5α-androstan-11β-ol.

References Cited in the file of this patent
UNITED STATES PATENTS 2,292,080 Marker _____ Aug. 4, 1942
2,561,378 Julian et al. _____ July 24, 1951